(12) United States Patent
Tomasu

(10) Patent No.: US 7,971,927 B2
(45) Date of Patent: Jul. 5, 2011

(54) DOOR TRIM FOR VEHICLE

(75) Inventor: Yoshiaki Tomasu, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 66 days.

(21) Appl. No.: 12/498,413

(22) Filed: Jul. 7, 2009

(65) Prior Publication Data
US 2010/0007171 A1 Jan. 14, 2010

(30) Foreign Application Priority Data

Jul. 14, 2008 (JP) .................................. 2008-183090

(51) Int. Cl.
*B60J 7/00* (2006.01)
(52) U.S. Cl. ................................ 296/187.12; 296/146.7
(58) Field of Classification Search ............... 296/146.7, 296/187.12
See application file for complete search history.

(56) References Cited

U.S. PATENT DOCUMENTS

| 2001/0017476 A1* | 8/2001 | Nishikawa et al. ........ 296/146.6 |
| 2008/0072405 A1 | 3/2008 | Horimatsu |
| 2008/0256875 A1 | 10/2008 | Narimatsu et al. |
| 2009/0179454 A1 | 7/2009 | Saida et al. |

FOREIGN PATENT DOCUMENTS

| JP | 2005-207524 | 8/2005 |
| JP | 2008-69824 | 3/2008 |

OTHER PUBLICATIONS

English language Abstract of JP 2005-207524, Aug. 4, 2005.
English language Abstract of JP 2008-69824, Mar. 27, 2008.

* cited by examiner

*Primary Examiner* — Joseph D Pape
(74) *Attorney, Agent, or Firm* — Greenblum & Bernstein, P.L.C.

(57) ABSTRACT

A door trim for a vehicle to be mounted to a door panel of the vehicle is provided. This door trim includes a door trim body and a mounting part to which a shock absorbing member for absorbing an impact load between the door panel and the door trim is mounted. The mounting part has a position restricting member for restricting the position of the shock absorbing member in the vehicle width direction relative to the door trim body.

3 Claims, 11 Drawing Sheets

The first comparison example the first deformation example in this invention

The second comparison example the second deformation example in this invention

The third comparison example the third deformation example in this invention

DOOR TRIM FOR VEHICLE

CROSS REFERENCE TO RELATED APPLICATION

This application claims priority from Japanese Patent Application No. 2008-183090 filed Jul. 14, 2008. The entire content of these priority applications is incorporated herein by reference.

TECHNICAL FIELD

The present invention relates to a mounting structure of a shock absorbing member to a door trim for vehicle.

BACKGROUND

Conventionally, a door trim for vehicle, to which a shock absorbing member (EA material) is attached for absorbing the impact generated in a vehicle collision as opposing a door panel, has been well-known (Patent literature 1: Japanese Unexamined Patent Publication No. 2005-207524). The mounting of the shock absorbing member has been performed by inserting a fastening member into a plurality of inner washers provided in the shock absorbing member, and then pressing the shock absorbing member in the vicinity of the fastening member toward the door trim for vehicle.

However, the inventor has realized that, according to this mounting method, at least a position of pressing surface in the vicinity of the fastening member fluctuates due to the manufacturing tolerance of the shock absorbing member, and thereby causing deformation and rattling of the door trim for vehicle.

Patent literature 1: Japanese Unexamined Patent Publication No. 2005-207524

SUMMARY

The present invention has been completed in order to solve at least a part of the above-mentioned conventional problem, and its purpose is to provide a technology for improving the mounting state and the mounting work of a shock absorber to a door trim for vehicle.

The present invention relates to a door trim for vehicle to be mounted to a door panel of a vehicle, said door trim for vehicle comprising: a door trim body, a mounting part to which a shock absorbing member for absorbing the impact load between the door panel and the door trim body is mounted, wherein the mounting part has a position restricting member for restricting the position of the shock absorbing member in the vehicle width direction relative to the door trim body.

The door trim for vehicle according to the present invention has a position restricting member for restricting the position of a shock absorbing member in the vehicle width direction relative to a door trim body, and thereby adjusting the positional relationship between the shock absorbing member and the door trim body by means of the position restricting member. This enables the partial interference and the rattling between the shock absorbing member and the door trim body caused by the manufacturing tolerance of the shock absorbing member to be restrained. The inventor of the present invention has realized that such interference and rattling occurred since the shock absorbing member has been manufactured from a material of a large manufacturing tolerance, such as a foamed material, for obtaining the shock absorbing function.

Additionally, the position restricting member may be for example a washer attached to a mounting boss as shown in the following embodiment.

DETAILED DESCRIPTION OF THE PREFERRED ILLUSTRATIVE ASPECTS

Figure 1:
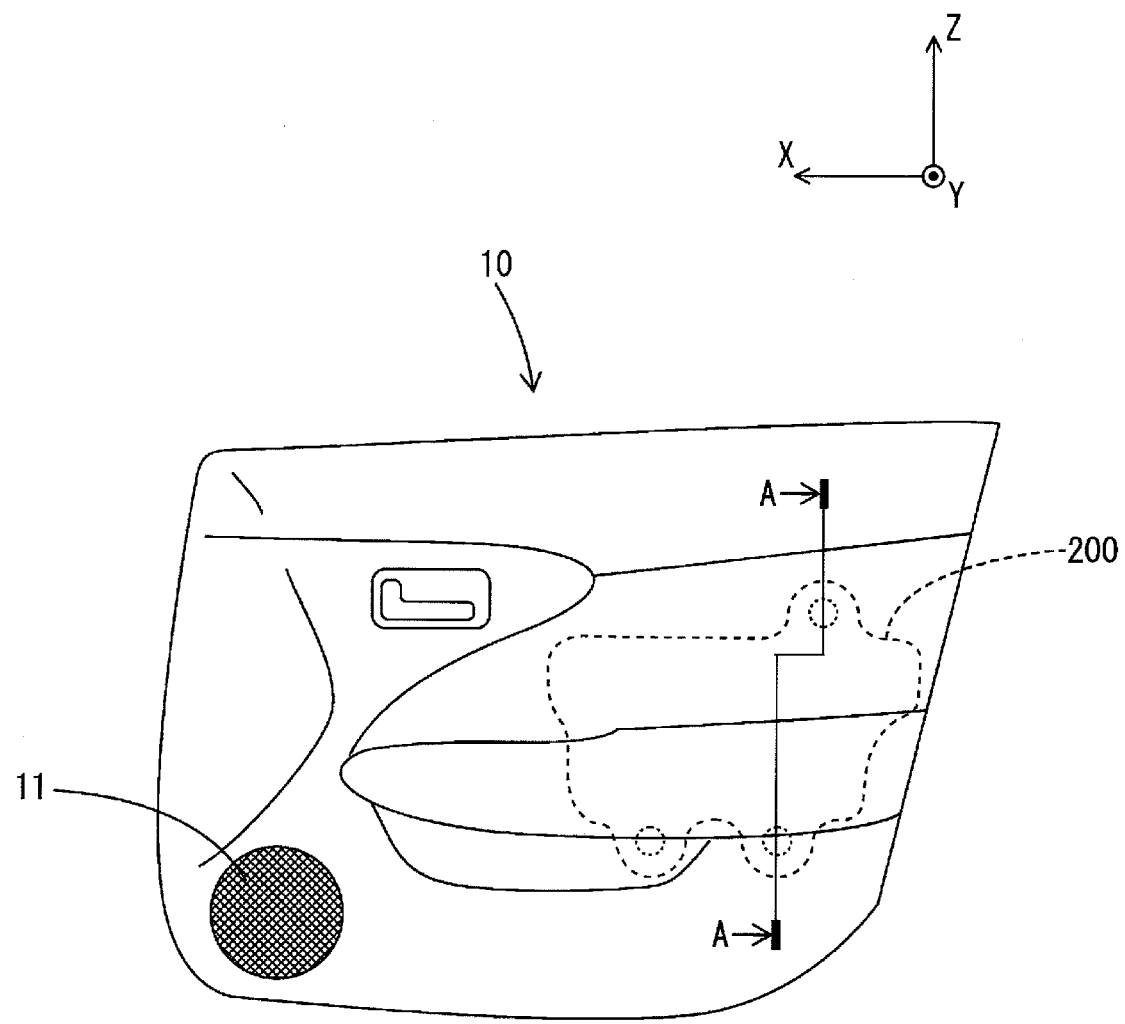
FIG. 1 is an explanatory view showing a shock absorbing pad equipped to a door for vehicle in the embodiment.

Next, an embodiment of the present invention is described in accordance with examples in the following order.
A. The door trim for vehicle in the embodiment:
B. Deformation example:

A. The Door Trim for Vehicle in the Embodiment:

FIG. 1 is an explanatory view showing a shock absorbing pad 200 as a shock absorbing member equipped to a door trim for vehicle 10 (a door of a driver's seat) in the embodiment. The door trim for vehicle 10 has a speaker grill 11.

Figure 2:
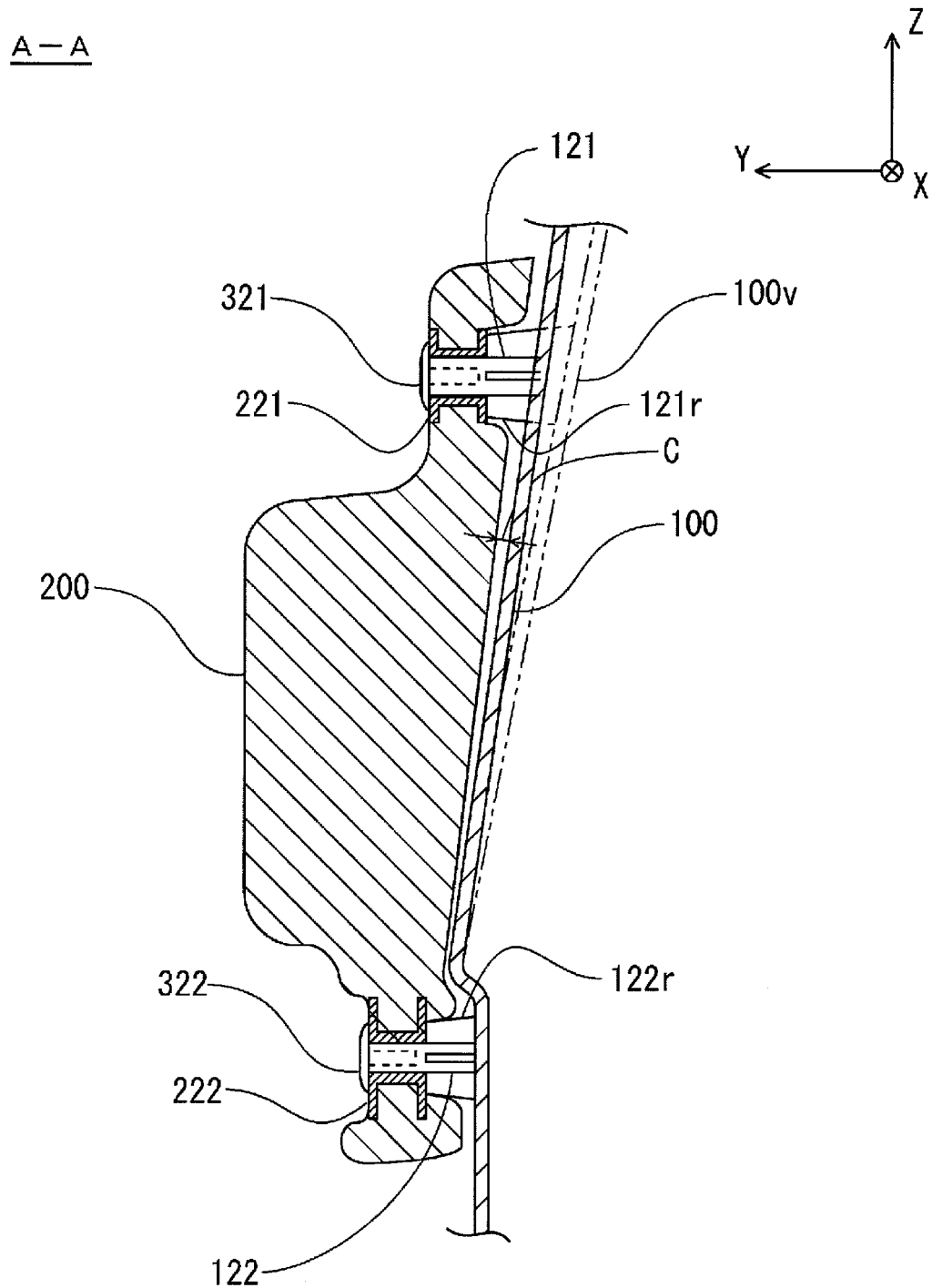
FIG. 2 is a cross-sectional view showing a state of the shock absorbing pad fastened to a door trim base material.

FIG. 2 is a cross-sectional view showing a state where the shock absorbing pad 200 is fastened to the outer side of the cabin (the left side in FIG. 2) of a door trim base material 100, which is made of synthetic resin material and composing the door trim for vehicle 10. The shock absorbing pad 200 is fastened to the door trim base material 100 in a manner that insert washers 221 and 222 provided in the outer peripheral edge part of the shock absorbing pad 200 is attached by a mounting bosses 121 and 122 formed in the door trim base material 100. The mounting position of the shock absorbing pad 200 is determined by being restricted when the insert washer 221 abuts a position restricting rib 121r in the mounting boss 121, while at the same time being restricted when the insert washer 222 abuts a position restricting rib 122r in the mounting boss 122.

According to this positioning, the shock absorbing pad 200 is fastened with a clearance C existed between the shock absorbing pad 200 and the door trim base material 100. This fastening method allows the shock absorbing pad 200 to be used without modification even when, for example, the door trim base material 100 is deformed into a shape of a door trim base material 100v due to design reason, or even when the door trim base material 100 is deformed in a direction approaching the shock absorbing pad 200. Furthermore, when manufacturing a plurality of varieties of such as the door trim base materials 100 and 100v, the parts of the shock absorbing pad 200 can be shared, and thereby providing benefits such as a reduced number of kinds of the shock absorbing pad 200, as well as prevention of mounting error in the mounting process.

Figure 3:
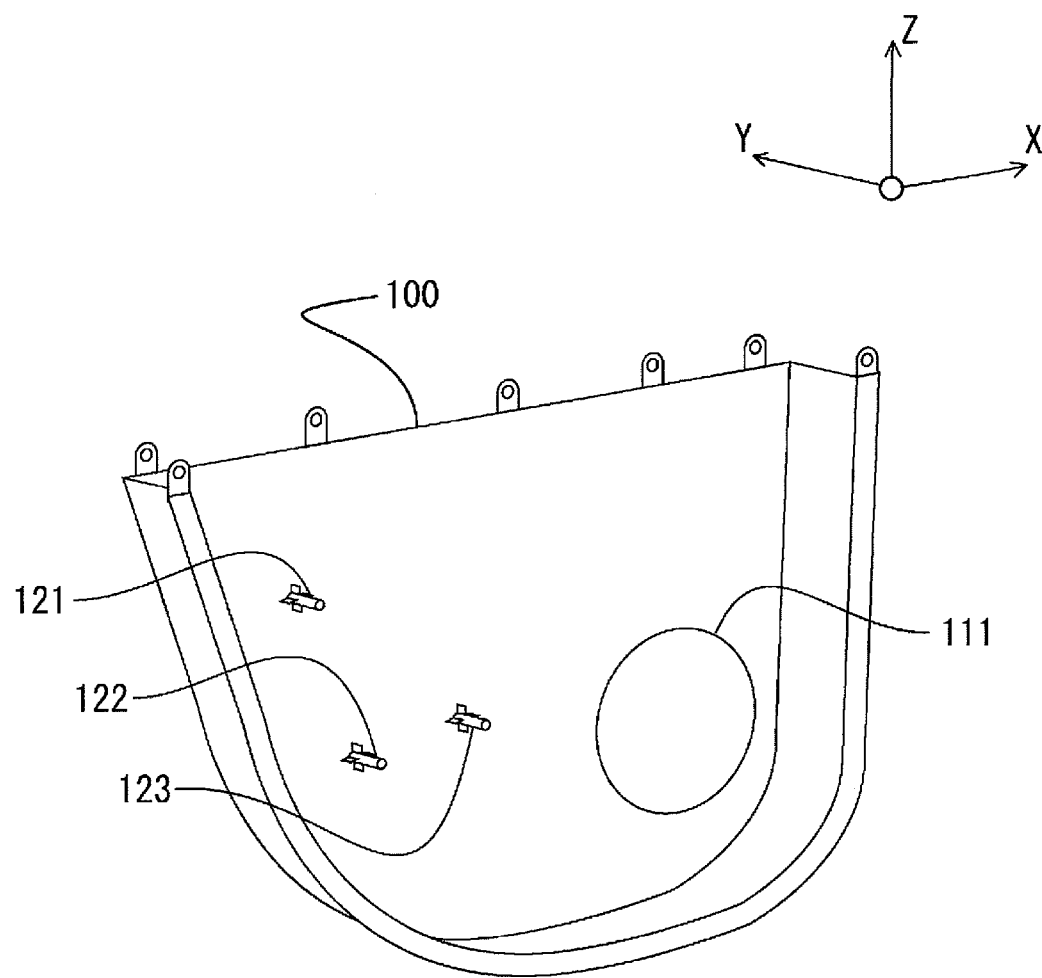
FIG. 3 is an explanatory view showing the door trim base material having a mounting boss for attaching the shock absorbing pad.

FIG. 3 is an explanatory view showing the door trim base material 100 having the mounting bosses 121, 122 and 123 (three in the embodiment) for attaching the shock absorbing pad 200. Formed in the door trim base material 100 is a speaker hole 111 in a position corresponding to a speaker grill 11. Additionally, according to the present embodiment, the mounting bosses 121, 122, and 123 represent "mounting part" in Claims of this invention.

Figure 4:
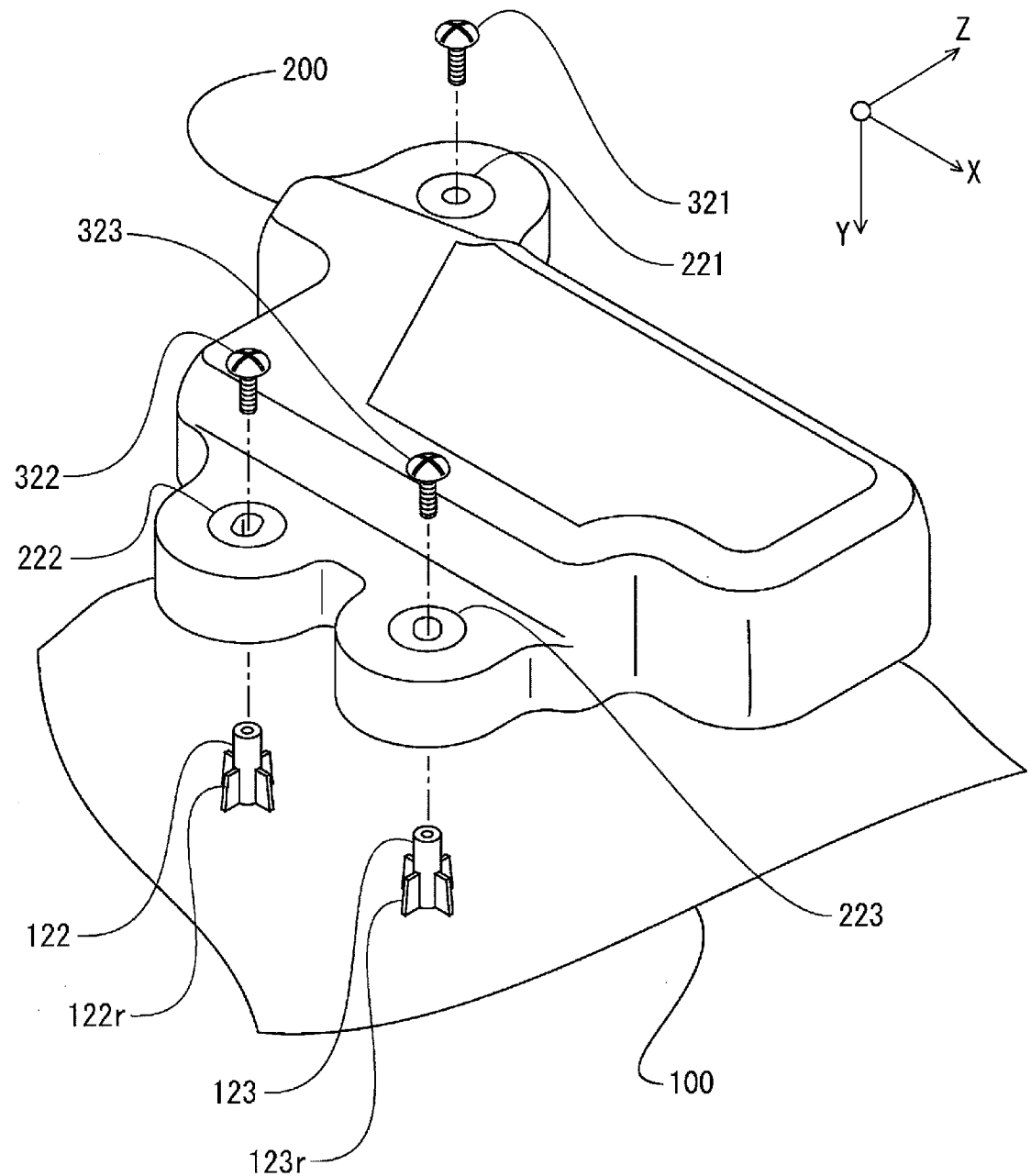
FIG. 4 is an explanatory view showing the mounting relationship between the door trim base material and the shock absorbing pad.

FIG. 4 is an explanatory view showing the mounting relationship between the door trim base material 100 and the shock absorbing pad 200. The shock absorbing pad 200 is formed as a hard foamed material obtained by foaming a synthetic resin material, such as polypropylene added with a foaming agent and polyurethan, and expanding it from 15 times to 45 times. The shock absorbing pad 200 is attached for the purpose of shock energy absorption (Energy Absorption: EA) in a side surface collision (side collision) into a door for vehicle, and also called EA material.

The shock absorbing pad 200 comprises insert washers 221, 222, and 223 (three in the embodiment) for being fastened to the door trim base material 100. The insert washers 221, 222, and 223 are fastened by screws 321, 322, and 323 (three in the embodiment) in a engaged state with the mounting bosses 121, 122, and 123 formed in the door trim base material 100. The position restricting ribs 121r, 122r, and 123r for restricting the position of the shock absorbing pad 200 (the position in the thickness direction, in other words, the position in the vehicle width direction, of the pad 200) are formed in each of the mounting bosses 121, 122, and 123. In addition, the insert washers 221, 222, and 223 and the mounting bosses 121, 122, and 123 are fastened by the screws 321, 322, and 323 in FIG. 4, however, thermal caulking for heating and softening the tips of the mounting bosses 121, 122, and 123 maybe used for this procedure.

Figure 5:
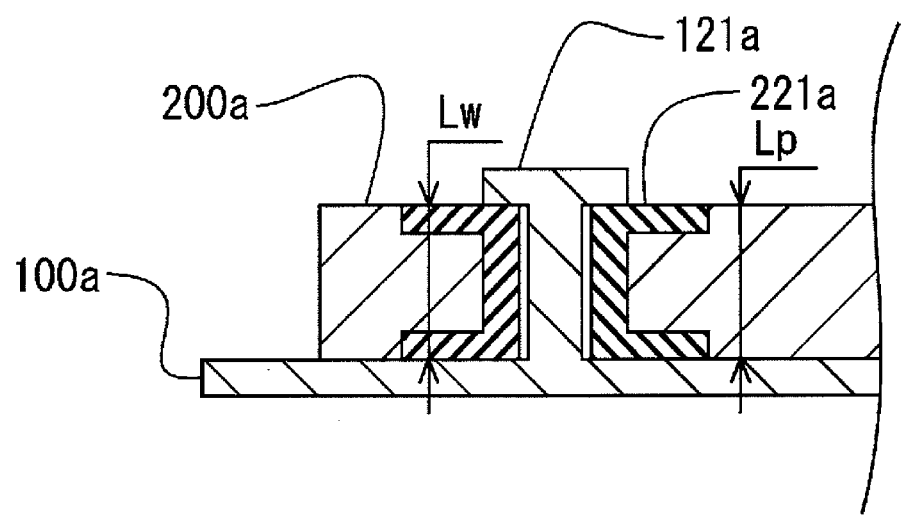
FIG. 5 is a cross-sectional view showing a state where the shock absorbing pad is fastened to the door trim base material by thermal caulking in the first comparison example.
Figure 10:
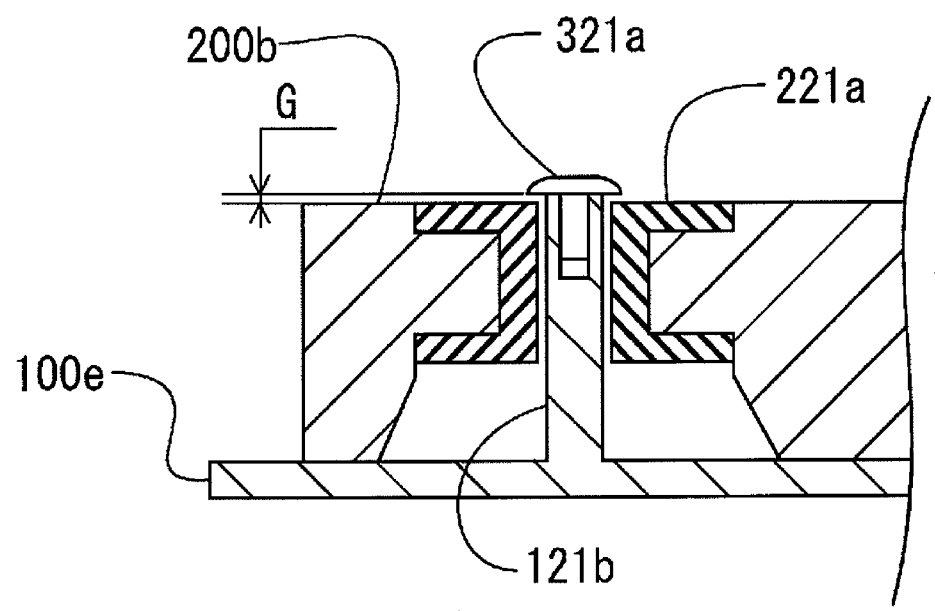
FIG. 10 is a cross-sectional view showing a state where the shock absorbing pad is fastened to the door trim base material in the third comparison example.

FIGS. 5 and 10 are explanatory views for explaining other benefits of the present embodiment. FIG. 5 is a cross-sectional view showing a state where a shock absorbing pad 200a is fastened to a door trim base material 100a by thermal caulking in the first comparison example. In this example, a length Lw of an insert washer 221a and a thickness Lp of the shock absorbing pad 200a are the same in the nominal value. However, the inventor of the present invention has realized the following problems, as focusing on the problem caused by the tolerance of the foamed material. The foamed material is regarded as having a manufacturing tolerance about 2 mm due to its material property.

Figure 6:
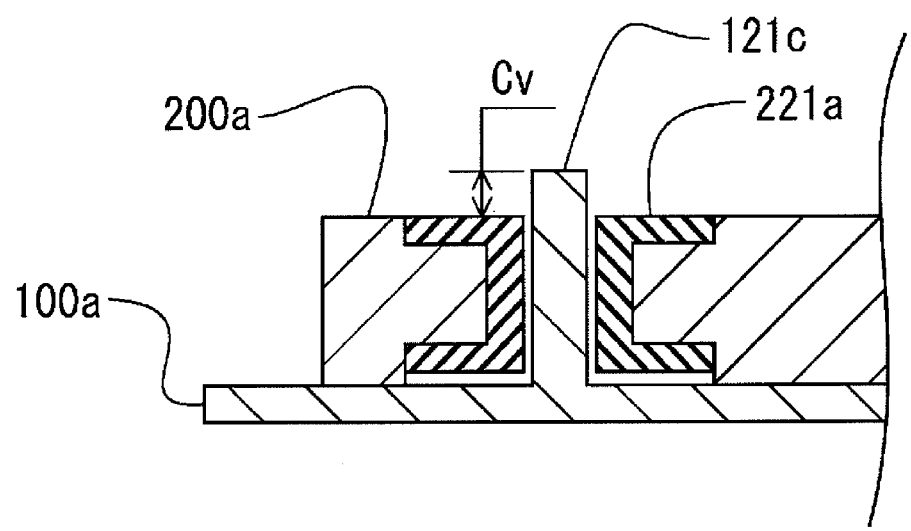
FIG. 6 is an explanatory view showing a decrease in caulking amount in the first comparison example.

FIG. 6 is an explanatory view showing a decrease in a caulking amount Cv in the first comparison example. In this comparison example, the shock absorbing pad 200a is fastened to the door trim base material 100a by thermal caulking. The caulking amount Cv is originally supplied as a difference between the length of a protrusion 121C and the length of the insert washer 221a. However, when the shock absorbing pad 200a has an excessive thickness due to the manufacturing tolerance, a clearance occurs between the insert washer 221a and the door trim base material 100a, and thus, the caulking amount is reduced for the amount of the clearance.

Figure 7:
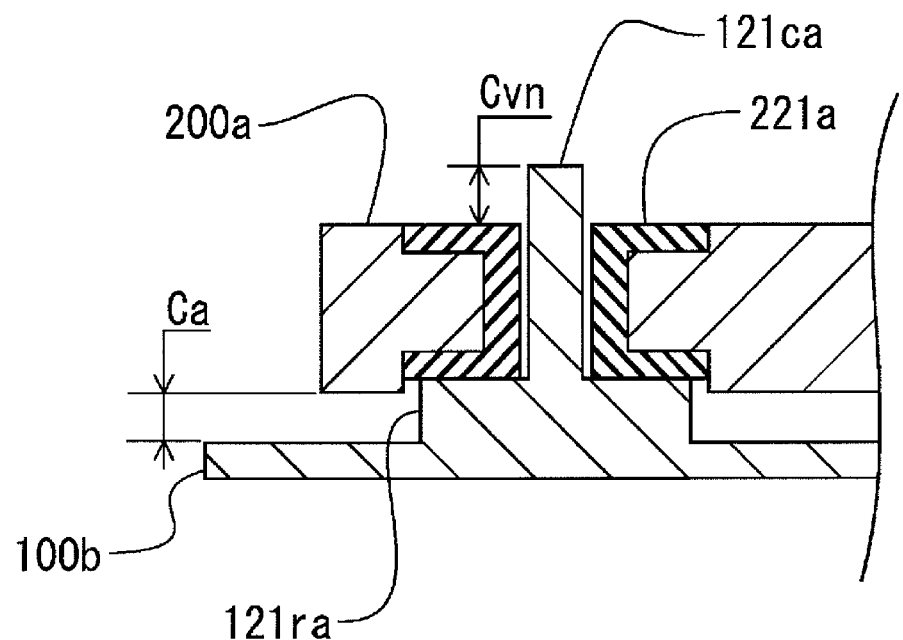
FIG. 7 is an explanatory view showing a mechanism for maintaining a caulking amount in the first deformation example according to the present invention.

FIG. 7 is an explanatory view showing a mechanism for maintaining a caulking amount Cvn in the first deformation example according to the present invention. In this deformation example, the position of the shock absorbing pad 200a is determined, with its position relative to the door trim base material 100b restricted by abutting a position restricting rib 121ra. At this determined position, the shock absorbing pad 200a is fastened to the door trim base material 100b with a clearance Ca existed therebetween. This clearance Ca absorbs the variation in the thickness of the shock absorbing pad 200a, and it can therefore be seen that the caulking amount Cvn is not affected by the variation in the thickness of the shock absorbing pad 200a. According to such mechanism, the present embodiment can contribute to secure a quality of the fastening done by thermal caulking.

Figure 8:
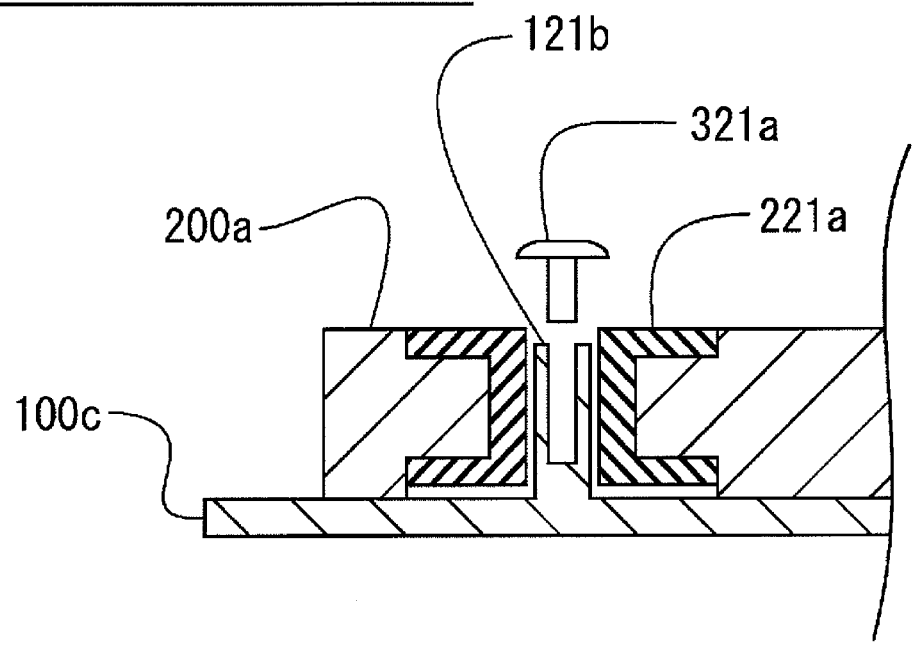
FIG. 8 is a cross-sectional view showing a state where the shock absorbing pad is fastened to the door trim base material in the second comparison example.

FIG. 8 is a cross-sectional view showing a state where the shock absorbing pad 200a is fastened to a door trim base material 100c by a screw 321a in the second comparison example. The second comparison example is different from the first comparison example in that the fastening method is shifted from thermal caulking to threading of a screw 321a. In this example, when the shock absorbing pad 200a has an excessive thickness due to the manufacturing tolerance, unlike the above-mentioned comparison example in which the caulking amount is decreased, the shock absorbing pad 200a is pressed toward the door trim base material 100c. The inventor of the present invention has discovered that this pressing causes the deformation of the door trim base material 100c.

Figure 9:
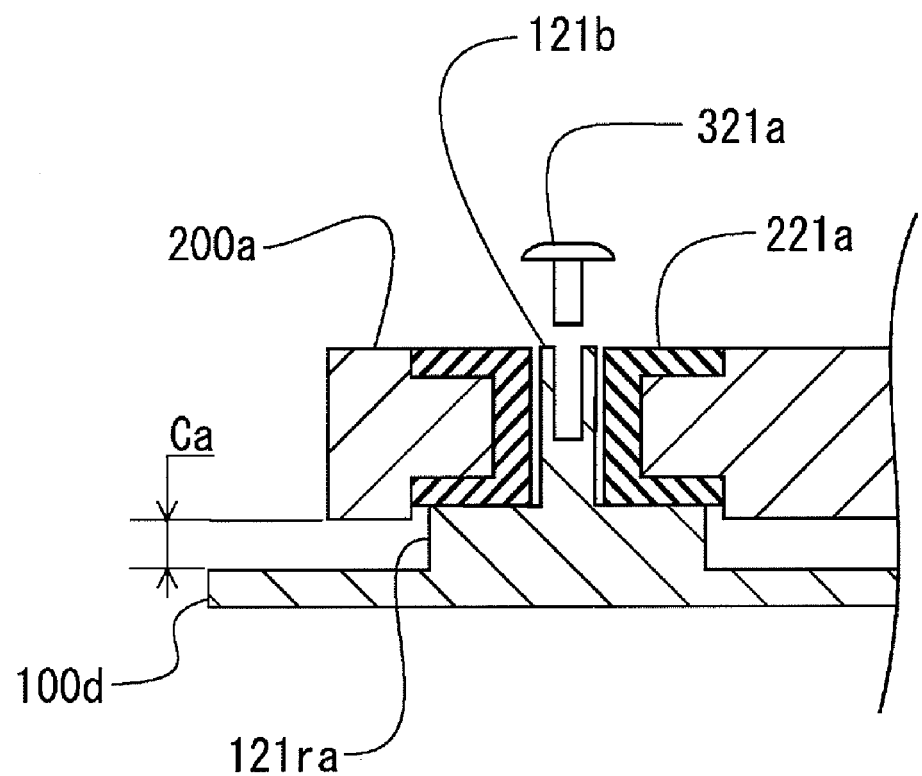
FIG. 9 is an explanatory view showing a mechanism for preventing deformation of the door trim base material in the second deformation example according to the present invention.

FIG. 9 is an explanatory view showing a mechanism for preventing deformation of a door trim base material 100d in the second deformation example according to the present invention. Also in this deformation example, the clearance Ca absorbs the variation in the thickness of the shock absorbing pad 200a, so that the shock absorbing pad 200a is not pressed toward the door trim base material 100d even when the thickness of the shock absorbing pad 200a is large due to the manufacturing tolerance. Furthermore, it can be understood that an excessively small clearance Ca can at least reduce the pressing amount.

FIG. 10 is a cross-sectional view showing a state where a shock absorbing pad 200b is fastened to a door trim base material 100e by a screw 321a in the third comparison example. The third comparison example is different from the first deformation example and the second deformation example, in that the thickness of the shock absorbing pad 200b is larger than that of the insert washer 221a even in the nominal value. In the present comparison example, the inventor of this invention has discovered that, when the shock absorbing pad 200b is thin due to the manufacturing tolerance, a gap G occurs between the screw 321a and the insert washer 221a. This gap G causes rattling of the shock absorbing pad 200b relative to the door trim base material 100e.

Figure 11:
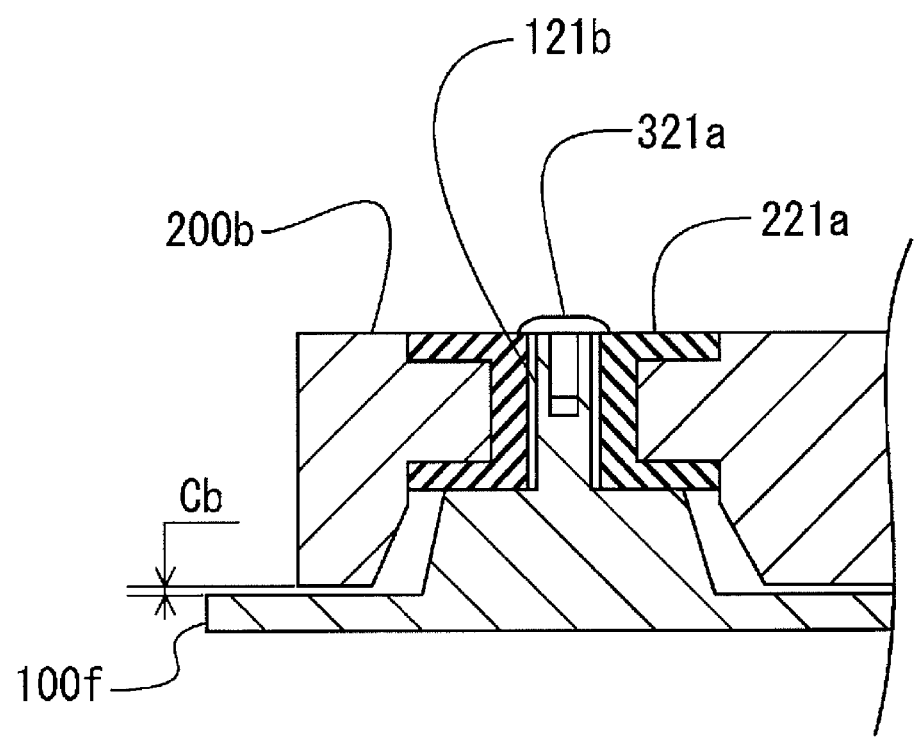
FIG. 11 is an explanatory view showing a mechanism for preventing rattling of the door trim base material in the third deformation example according to the present invention.

FIG. 11 is an explanatory view showing a mechanism for preventing rattling of a door trim base material 100f in the third deformation example according to the present invention. Also in this deformation example, the clearance Cb absorbs the variation in the thickness of the shock absorbing pad 200b, so that the gap does not occur even when the thickness of the shock absorbing pad 200b is thin due to the manufacturing tolerance. In addition, the insert washer 221a is produced by a manufacturing method of a small manufacturing tolerance, such as injection molding, and is also harder than the shock absorbing pad 200b. The insert washer 221 is therefore stable at the time of fastening without elastic deformation, and can absorb the manufacturing tolerance of the shock absorbing pad 200b.

As mentioned, according to the present embodiment and the deformation examples, the positional relationship between such as the shock absorbing pad 200 and such as the door trim base material 100 is restricted by the position restricting ribs 121r, 122r, and 123r, so that the manufacturing tolerance of such as the shock absorbing pad 200 can be absorbed, and thereby stabling the fastening state thereof.

B. Deformation Example

With embodiments of the present invention described above with reference to the accompanying drawings, it is to be understood that the invention is not limited to those precise embodiments, and various embodiments can be made without departing from the scope of the present invention. In particular, the elements in each of the above embodiments other than the elements described in the independent Claims are additional, and can therefore be accordingly omitted. Moreover, as to also the elements described in the independent Claims, they can be replaced with the elements not described in the independent Claims, within the scope disclosed in the Description of the present application.

Furthermore, in the above-mentioned embodiment, not all of the above-mentioned advantages and effects are connected to the essential elements of the present invention, whereas the present invention provides the degree of design freedom that easily realizes each of the above-mentioned advantages and effects, and may therefore realize at least one advantage or effect.

Additionally, in the above embodiment, the positional relationship between the shock absorbing pad and the door trim base material is restricted by using the position restricting rib, however, this maybe done by, for example, a washer attached to such as the mounting boss for the positioning. Any position restricting member, which at least restricts the positional relationship between the shock absorbing pad and the door trim base material, may generally be used in the present invention.

What is claimed is:

1. A door trim to be mounted to a door panel of a vehicle, said door trim comprising:
    a door trim body, and
    a mounting part mounted to a shock absorbing member that absorbs an impact load between the door panel and the door trim body,
    wherein the mounting part has a position restricting member for restricting a position of the shock absorbing member in the vehicle width direction relative to the door trim body, and
    wherein the shock absorbing member has an insert washer for being mounted to the door trim body, and the position restricting member only contacts the insert washer to form a spaced clearance between the shock absorbing member and the door trim body.

2. The door trim for vehicle according to claim 1, wherein the position restricting member includes a rib formed in the mounting part.

3. A door trim to be mounted to a door panel of a vehicle, said door trim comprising:
    a door trim body,
    a shock absorbing member for absorbing an impact load between the door panel and the door trim body, and
    a mounting part mounted to the shock absorbing member,
    wherein the shock absorbing member is mounted to the door trim body in a position restricted by a position restricting member that is provided on the mounting part, and
    wherein the shock absorbing member has an insert washer for being mounted to the door trim body, and the position restricting member only contacts the insert washer to form a spaced clearance between the shock absorbing member and the door trim body.

* * * * *